US012791252B2

(12) United States Patent
DeMarco

(10) Patent No.: US 12,791,252 B2
(45) Date of Patent: Nov. 10, 2026

(54) COOLING SYSTEM FOR FREEZE DRYER

(71) Applicant: IMA Life North America Inc., Tonawanda, NY (US)

(72) Inventor: Francis W. DeMarco, North Tonawanda, NY (US)

(73) Assignee: IMA LIFE NORTH AMERICA INC., Tonawanda, NY (US)

( * ) Notice: Subject to any disclaimer, the term of this patent is extended or adjusted under 35 U.S.C. 154(b) by 498 days.

(21) Appl. No.: 18/285,672

(22) PCT Filed: Apr. 16, 2021

(86) PCT No.: PCT/US2021/027579
§ 371 (c)(1),
(2) Date: Oct. 5, 2023

(87) PCT Pub. No.: WO2022/220836
PCT Pub. Date: Oct. 20, 2022

(65) Prior Publication Data
US 2024/0369296 A1 Nov. 7, 2024

(51) Int. Cl.
*F26B 5/06* (2006.01)
*F25B 25/00* (2006.01)
*F26B 21/35* (2026.01)

(52) U.S. Cl.
CPC .............. *F26B 5/06* (2013.01); *F25B 25/005* (2013.01); *F26B 21/35* (2026.01)

(58) Field of Classification Search
CPC ........... F26B 5/06; F26B 25/005; F26B 21/35
USPC ...................................................... 34/92, 284
See application file for complete search history.

(56) References Cited

U.S. PATENT DOCUMENTS

| | | | | |
|---|---|---|---|---|
| 4,407,140 | A | 10/1983 | Kobayashi | |
| 5,837,193 | A | 11/1998 | Childers et al. | |
| 6,220,048 | B1 | 4/2001 | Finan, Sr. et al. | |
| 7,640,756 | B2 * | 1/2010 | Brahmbhatt | F26B 5/06 34/301 |
| 10,113,797 | B2 * | 10/2018 | Dern | A23F 5/32 |
| 10,641,661 | B2 * | 5/2020 | Ganguly | G01K 1/024 |
| 10,793,327 | B2 * | 10/2020 | Weimer | A01N 1/162 |
| 11,181,320 | B2 * | 11/2021 | Dern | F26B 5/06 |
| 11,577,893 | B2 * | 2/2023 | Heinlein | A61K 9/19 |
| 11,609,587 | B2 * | 3/2023 | Brower | G05D 23/1919 |

(Continued)

FOREIGN PATENT DOCUMENTS

| | | | | |
|---|---|---|---|---|
| CA | 3078625 A1 * | 4/2019 | | A61J 1/10 |
| CN | 102636016 A | 8/2012 | | |

(Continued)

OTHER PUBLICATIONS

International Search Report, International Application No. PCT/US2021/027579, mailed Dec. 13, 2021, pp. 1-4, European Patent Office.

(Continued)

*Primary Examiner* — Stephen M Gravini
(74) *Attorney, Agent, or Firm* — Barclay Damon LLP

(57) ABSTRACT

In freeze drying systems and methods, a cooling system is supplemented at peak loads with a cold thermal energy storage (CTES) system that utilizes a phase change material (PCM). The system permits the use of an alternative cooling system, such as a turbo compressor cooling system, while still meeting peak cooling capacity requirements.

16 Claims, 8 Drawing Sheets

(56) References Cited

U.S. PATENT DOCUMENTS

| | | | | |
|---|---|---|---|---|
| 11,930,835 | B1 * | 3/2024 | Nguyen | A23L 33/135 |
| 12,072,149 | B2 * | 8/2024 | Britton | F26B 5/06 |
| 12,225,914 | B1 * | 2/2025 | Porter | A23G 7/0093 |
| 2018/0259253 | A1 | 9/2018 | Tsubata et al. | |
| 2019/0226761 | A1 | 7/2019 | Gong et al. | |
| 2024/0142172 | A1 * | 5/2024 | Beutler | F25B 9/008 |
| 2024/0369296 | A1 * | 11/2024 | Demarco | F26B 5/06 |
| 2026/0029195 | A1 * | 1/2026 | Corbin | F26B 25/003 |

FOREIGN PATENT DOCUMENTS

| | | | | |
|---|---|---|---|---|
| CN | 203857704 | U | 10/2014 | |
| CN | 109764641 | A | 5/2019 | |
| CN | 210921975 | U | 7/2020 | |
| IN | 2888374 | Y | 4/2007 | |
| JP | H07269998 | A | 10/1995 | |
| JP | 2003194459 | A | 7/2003 | |
| JP | 2009156499 | A | 7/2009 | |
| JP | 2015031486 | A | 2/2015 | |
| JP | 2021500919 | A * | 1/2021 | A01N 1/165 |
| KR | 102123354 | B1 | 6/2020 | |
| RU | 2116590 | C1 | 7/1998 | |
| WO | WO-2026024347 | A1 * | 1/2026 | B29C 51/421 |

OTHER PUBLICATIONS

Written Opinion of the International Search Authority, International Application No. PCT/US2021/027579, mailed Dec. 13, 2021, pp. 1-8, European Patent Office.

* cited by examiner

COOLING SYSTEM FOR FREEZE DRYER

CROSS REFERENCE TO RELATED APPLICATION

This application is a U.S. national phase application and claims the benefit of priority under 35 U.S.C. § 371 of International Patent Application No. PCT/US2021/027579 filed on 16 Apr. 2021 entitled COOLING SYSTEM POR FREEZE DRYER, which is incorporated herein by reference in its entirety.

FIELD OF THE INVENTION

The present invention relates generally to freeze drying processes and equipment for removing moisture from a product using sublimation. More specifically, the invention relates to systems and methods for cooling a freeze drying chamber and a freeze drying condenser using a cold thermal energy storage (CTES) system.

BACKGROUND

Freeze drying is a process that removes a solvent or suspension medium, typically water, from a product. Freeze-drying is a low-pressure, low-temperature condensation pumping process widely used in the manufacture of pharmaceuticals. In a freeze drying process for removing water, the water in the product is frozen to form ice and, under vacuum, the ice is sublimated and the resulting water vapor flows to a condenser. The water vapor is condensed on the condenser as ice and is later removed from the condenser. Freeze drying is particularly useful in the pharmaceutical industry, as the integrity of the product is preserved during the freeze drying process and product stability can be guaranteed over relatively long periods of time. The freeze dried product is ordinarily, but not necessarily, a biological substance.

Typical freeze drying processes used in the pharmaceutical industry may process either bulk product or product contained in vials. In an example of a bulk freeze drying system 100 shown in FIG. 1, a batch of bulk product 112 is placed in freeze dryer trays 121 within a freeze drying chamber 110. Freeze dryer shelves 123 are used to support the trays 121. Alternatively, product containment vials containing the product are placed on the shelves. The freeze dryer shelves serve as heat exchangers for transferring heat to and from the trays or vials as required by the process. A heat transfer fluid flowing through conduits within the shelves 123 is used to remove or add heat.

The suspended or dissolved product is frozen by removing heat via the heat transfer fluid. Under vacuum, the frozen product 112 is heated, also via the heat transfer fluid, to cause sublimation of ice within the product. Vapor resulting from the sublimation of the ice flows through a passageway 115 into a condensing chamber 120 containing condensing coils or other surfaces 122 maintained below the condensation temperature of the vapor. A heat exchange fluid is passed through the coils 122 to remove heat, causing the vapor to condense as ice on the coils.

Both the freeze drying chamber 110 and the condensing chamber 120 are maintained under vacuum during the process by a vacuum pump 150 connected to the exhaust of the condensing chamber 120. Non-condensable gases contained in the chambers 110, 120 are removed by the vacuum pump 150 and exhausted at a higher pressure outlet 152.

The heat exchange fluids circulating through the condenser 220 and the shelves 223 of the freeze drying chamber 210 may be cooled by the same refrigeration system or by different refrigeration systems.

SUMMARY

The present disclosure addresses the needs described above by providing a freeze drying system. The system comprises a freeze dryer chamber including a chamber heat exchanger for cooling and heating a product in the freeze dryer chamber. The system further comprises a freeze dryer condenser connected to the freeze dryer chamber for receiving exhaust gases from the freeze dryer chamber. Condensing surfaces of the freeze dryer condenser are provided to condense the exhaust gases.

A first heat exchange fluid circuit is selectively connected to the condensing surfaces for circulating a first heat exchange fluid to the condensing surfaces. A turbo compressor cooling system is connected for cooling the first heat exchange fluid.

A second heat exchange fluid circuit is connected for circulating a second heat exchange fluid through the chamber heat exchanger. An inter-circuit heat exchanger is connected for exchanging heat energy between the first heat exchange fluid and the second heat exchange fluid.

A cold thermal energy storage system is connected for cooling at least the second heat exchange fluid. The cold thermal energy storage system includes a phase change material for storing cold thermal energy.

Another embodiment of the invention is a method for method for freeze drying a product. The method includes sterilizing a freeze drying chamber using a clean-in-place arrangement; loading the freeze drying chamber with the product; during at least one of the sterilizing and the loading of the freeze drying chamber, recharging a cold thermal energy storage system by cooling a phase change material of the cold thermal energy storage system using a turbo-compressor cooling system; after the recharging the cold thermal energy storage system, chilling an interior of the freeze drying chamber to a process temperature using the turbo-compressor cooling system supplemented by the cold thermal energy storage system; freezing a component of the product in the freeze drying chamber to form a frozen component; sublimating the frozen component in the freeze drying chamber to form a vapor; condensing the vapor in a condenser using the turbo-compressor cooling system; and unloading the product from the freeze drying chamber.

DESCRIPTION

Cooling systems for current commercial freeze dryers often use working fluids that are greenhouse gases. Prior to the 1987 Montreal Protocol on Substances that Deplete the Ozone Layer, cooling system working fluids for freeze dryers were often based on chlorofluorocarbons (CFCs) and hydrochlorofluorocarbons (HCFCs), which are powerful ozone-depleting agents. That treaty eliminated most use of those working fluids. CFCs and HCFCs were replaced with hydrofluorocarbons (HFCs) such as R-410a and R-507a, which are in wide use today. HFCs, however, are strong greenhouse gases. Various jurisdictions around the world are now restricting or banning the use of HFC-based refrigerants. Some manufacturers, including pharmaceutical manufacturers, are considering proactively eliminating the use of man-made refrigerants in their processing equipment, including freeze dryers.

To address the problem of using working gases that potentially harm the environment, the authors have utilized a turbo compressor cooling system to perform the primary cooling function in a freeze drying system. A turbo compressor cooling system utilizes air or nitrogen as a working fluid in a Bell-Coleman cycle (also called a reverse Brayton cycle), in which the expansion and compression stages approximate isentropic processes and the cooling and heating stages approximate isobaric processes. The system includes an arrangement in which a turbo-compressor and a turbo-expander share a common shaft with an electric motor. Mechanical energy from the turbo-expander supplements energy from the motor to drive the turbo-compressor, resulting in increased efficiency. The ultra-low temperature working fluid from the expander is used to cool the condenser and the freeze drying chamber of the freeze drying system.

Figure 1:
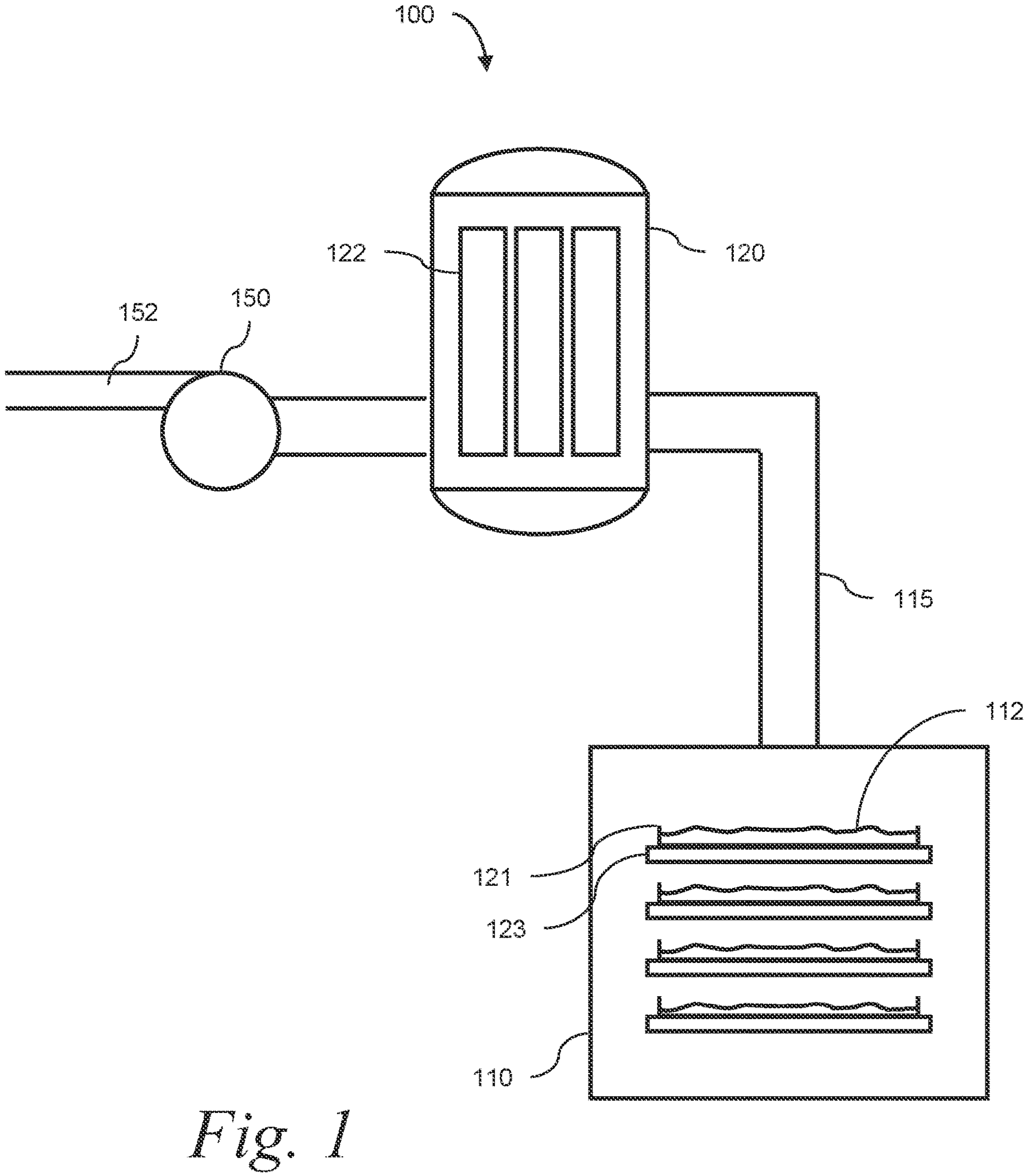
Fig. 1 PRIOR ART
FIG. 1 is a schematic drawing of a prior art freeze drying system.
Figure 2:
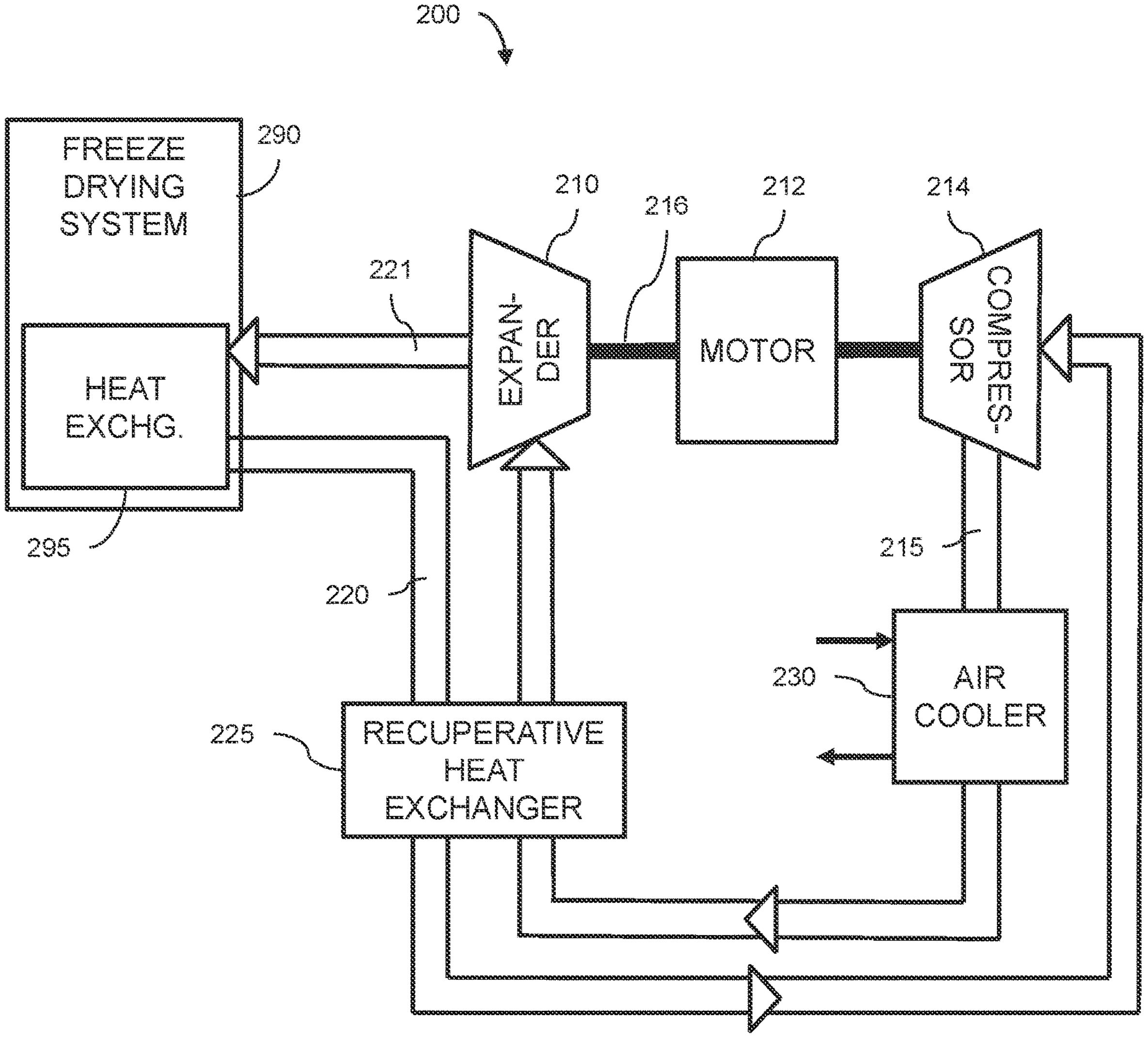
FIG. 2 is a schematic drawing of turbo compressor cooling system according to one embodiment of the disclosure.

A schematic diagram of an example turbo compressor cooling system 200 is shown in FIG. 2. Energy is extracted from a compressed, gaseous working fluid (such as air or nitrogen) by an expander 210 to produce a low pressure, ultra-low temperature gas 221. The extracted energy from the expander 210 is transferred via a driveshaft 216 to a compressor unit 214. The low pressure, ultra-low temperature gas 221 is routed to one or more heat exchangers 295 of a freeze drying system 290, where it absorbs heat energy from a condenser and from shelves in a freeze drying chamber.

A freeze dryer return line 220 from the freeze drying system 290 passes through a recuperative heat exchanger 225, where additional heat energy is exchanged between the freeze dryer return line 220 and the compressor output 215, increasing system efficiency. The resulting low temperature, low pressure working fluid in the freeze dryer return line 220 is routed to the inlet of the compressor 214.

Using mechanical energy from the motor 212 and from the expander 210, the compressor 214 compresses the working fluid to produce a high pressure and high temperature working fluid in the compressor output 215. Heat is rejected from that working fluid to atmosphere by an air cooler 230, or by a water chiller or another analogous device. As noted above, additional heat energy is transferred from the compressor output 215 to the freeze dryer return line 220 by the recuperative heat exchanger 225. The resulting high-pressure, low-temperature working fluid is routed to the expander 210 to complete the cycle.

Figure 3:
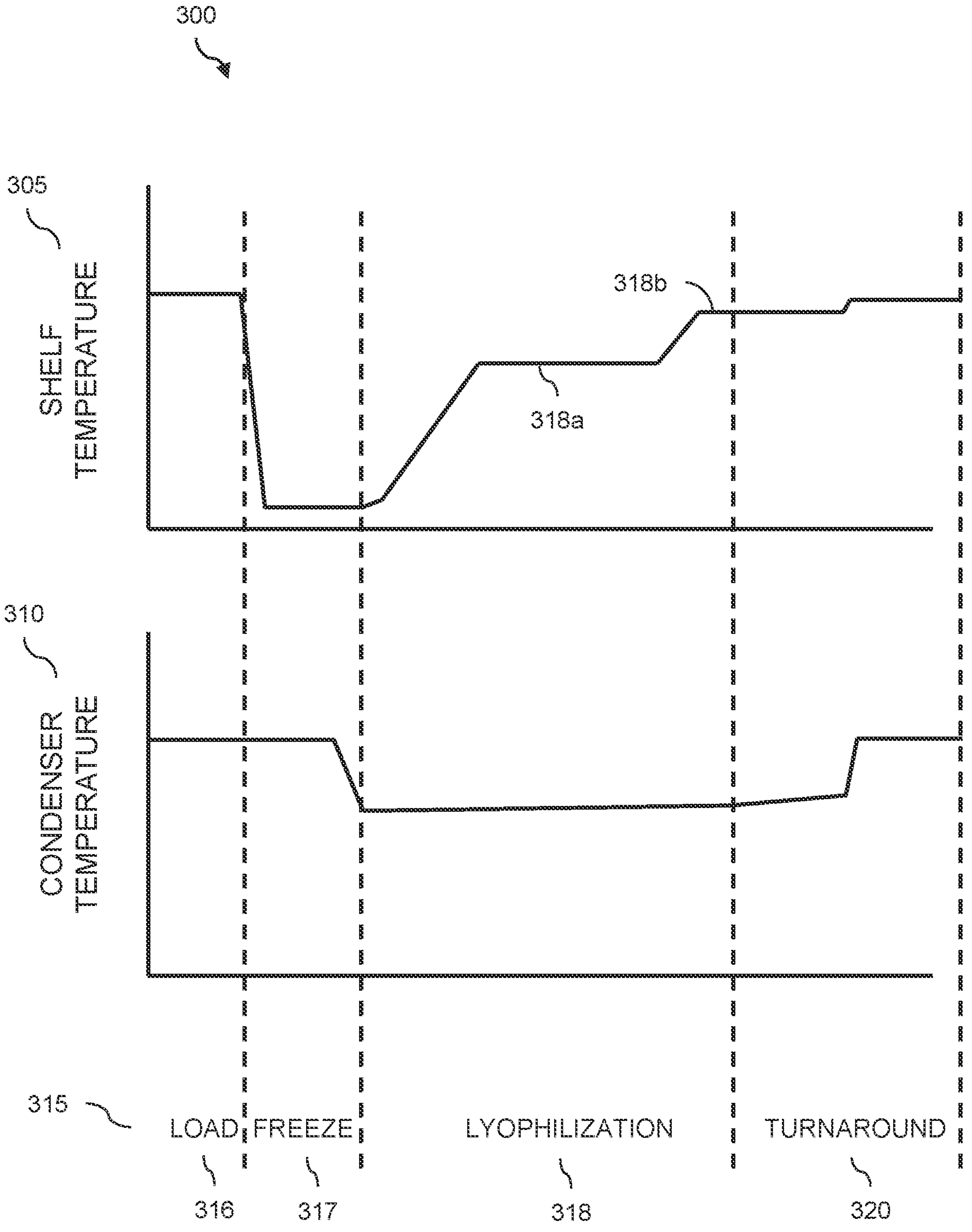
FIG. 3 is a graph showing component temperatures during several stages of a freeze drying cycle according to embodiments of the disclosure.

A typical temperature cycle 300 of a commercial freeze drying system is shown schematically in FIG. 3. In the schematic diagram, a temperature 305 of the freeze drying chamber shelves and a temperature 310 of the condenser coil are shown as functions of the sequential stages 315 of a freeze drying cycle, including LOAD 316, FREEZE 317, LYOPHILIZATION 318, UNLOAD 319 and TURNAROUND 320.

During the LOAD portion 316 of the cycle, the shelf temperature and condenser coil temperature are maintained near ambient temperature as the vials or bulk materials are loaded into the chamber, or alternatively the shelves may be cooled as demanded by the product recipe. During the TURNAROUND portion 320 of the cycle, the system is unloaded, defrosted, cleaned, sterilized, dried and leak tested. The ice on the condenser coils is melted and drained away. Hot cleaning agents may be used to clean or sterilize the freeze drying components including the freeze drying chamber and the condenser. Clean-in-place (CIP) and sterilize-in-place arrangements that do not require disassembly of the freeze drying equipment may be used. For example, steam nozzles or sterilization sprayers permanently installed to clean the interior of the equipment may be used. The freeze dryer cooling system may be used during the TURNAROUND portion of the cycle to warm the condenser during defrosting and to chill the shelves during loading. Shelf loading temperatures may be between ambient and −50° C., depending on process requirements. The freeze dryer cooling system may also be used to cool the system after drying. During leak testing, the freeze dryer cooling system must be run to evaluate for coolant leaks.

During the FREEZE portion 317 of the cycle, the temperature of product in the freezing chamber must be brought from ambient conditions to −40° C. or lower. The rate of temperature change during the FREEZE portion 317 of the cycle directly affects the overall cycle time of the freeze drying system, because other stages of the cycle may not take place during that stage. The cooling capacity of the cooling system of the freeze dryer therefore directly affects cycle time. Additionally, the freezing rate must be carefully controlled to control critical product quality characteristics within the freezing product. A freeze drying system of sufficient capacity to maintain the desired cooling rate is therefore of critical importance.

During the LYOPHILIZATION portion 318 of the cycle, the freeze drying chamber is maintained at low process temperatures. The freeze dryer cooling system must absorb heat from condensation in the condenser and must maintain the freeze drying chamber at process temperatures. It is further necessary to introduce heat into the system (the shelves) to drive the sublimation process. The sublimation of ice in the product removes energy from the product, and the sublimation would otherwise cause the product to cool down until the sublimation stops. A considerable amount of heat must be added via the shelves to keep the sublimation process going.

During a primary drying phase **318*a*, crystalline water ice is slowly sublimated to avoid forming liquid water, which might degrade the product. During a secondary drying phase 318*b***, remaining individual water molecules are removed at a higher temperature because the ice-to-water phase change is no longer of concern. For example, a typical shelf temperature in primary drying might be −10° C. to +10° C., or as high as 20° C., and secondary drying could be 20° C. to 40° C. Little or no cooling is required for the shelves in the secondary phase. In other cases, the product requires a very slow process with shelves at −30° C. In those cases, it might be necessary to bleed in some cooling for control as the pump energy tends to heat the system.

Most commercial pharmaceutical freeze dryer applications have maximum floor space requirements for installation in a lab or manufacturing facility, and any new freeze dryer cooling system must occupy an area comparable to the area occupied by a traditional HFC-based system.

The author has found that a reasonably-sized turbo compressor cooling system does not have the peak capacity needed to keep the cool-down/freezing cycle of a commercial freeze dryer within an acceptable cycle time. To take advantage of the environmental benefits of a turbo compressor cooling system in a commercial freeze drying system, while still meeting the peak cooling requirements and maximum floor space specifications of the system, the authors have supplemented a turbo compressor cooling system with a cold thermal energy storage (CTES) system.

A CTES system stores and retrieves cold thermal energy for low temperature applications. CTES uses the latent heat storage properties of a material. The technique stores heat at a differential temperature or different phase that allows energy to be stored for later use.

Two approaches/types of energy storage material may be used: sensible heat and latent heat. A sensible heat approach uses large volumes of a cold fluid, and relies on the latent heat storage of that fluid. Thermal energy is gradually transferred to the fluid as the temperature of the fluid rises.

Latent heat systems use the phase change energy of a phase change material (PCM) to provide a near constant temperature energy sink. Latent heat systems use a smaller volume for larger energy storage.

Examples of PCM's for cold applications include paraffin (organic) (to −37° C.), petroleum-derived materials, plant derived materials, eutectic salts (to −65° C.) and alcohol/glycols (to −100° C.). In one embodiment of the presently described system a eutectic salt-based PCM is used to supplement a turbo compressor cooling system of a freeze dryer.

Figure 4:
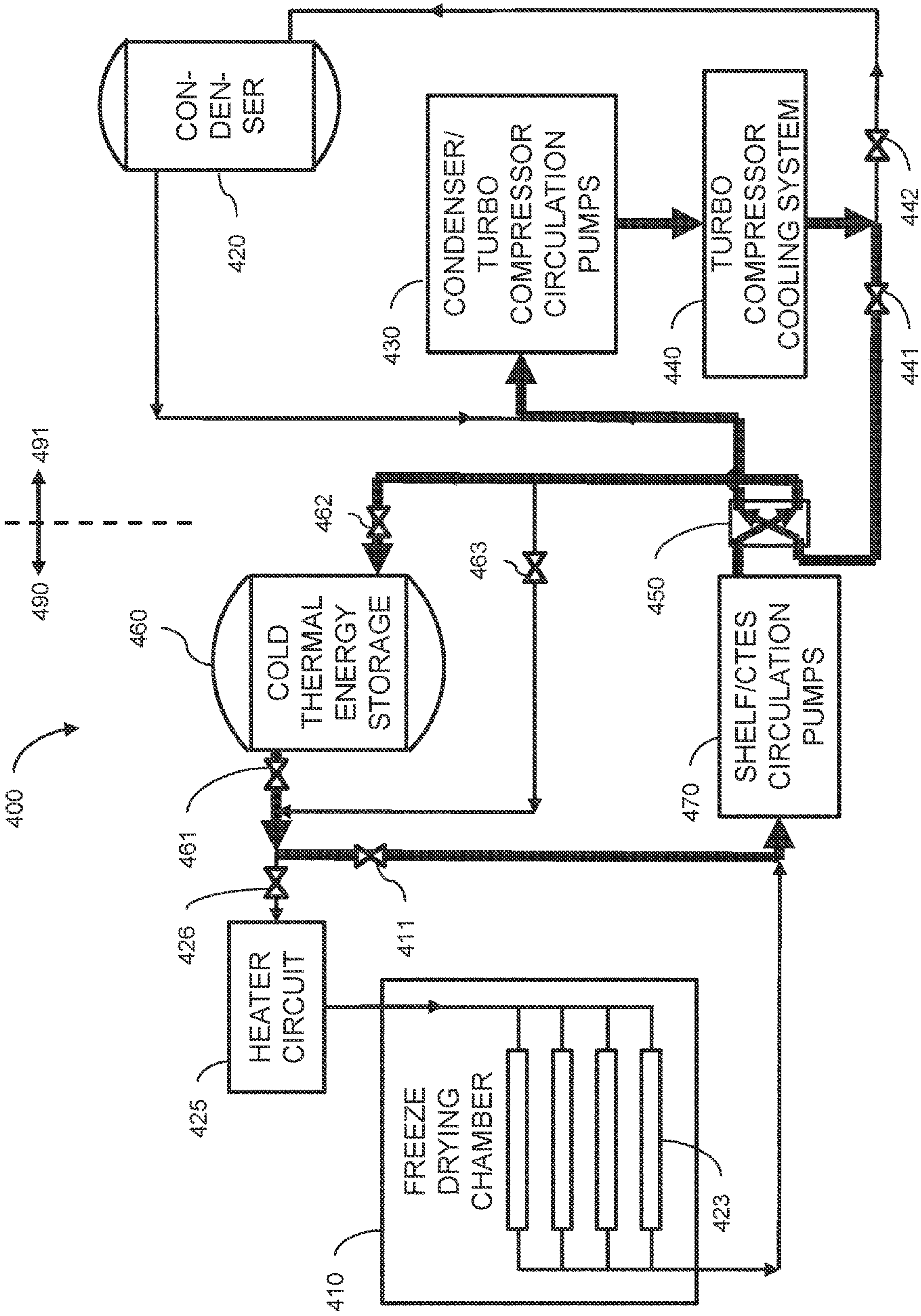
FIG. 4 is a schematic drawing of a freeze drying system operating during a turnaround portion of a freeze drying cycle according to an embodiment of the disclosure.
Figure 5:
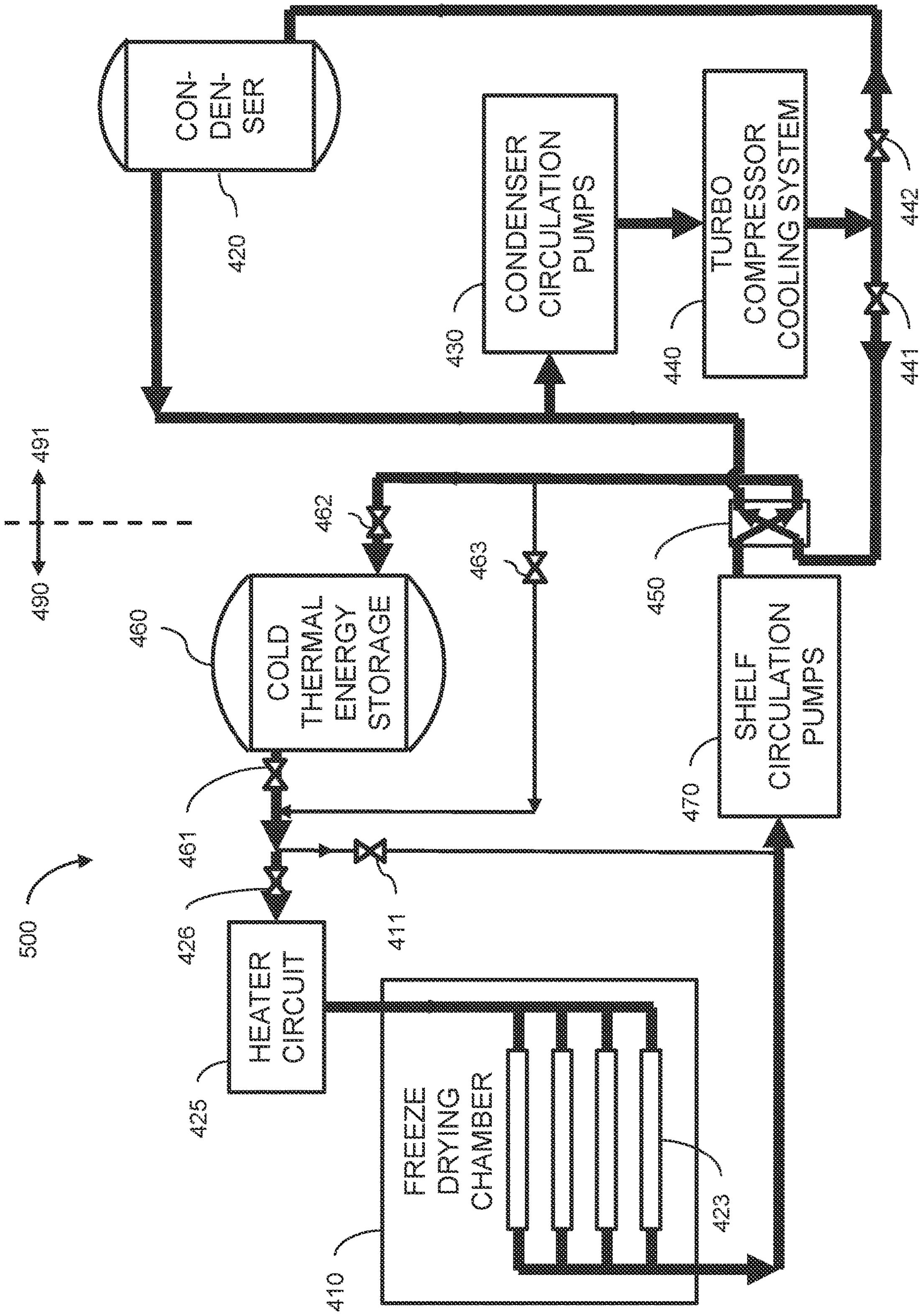
FIG. 5 is a schematic drawing of a freeze drying system operating during a freeze portion of a freeze drying cycle according to an embodiment of the disclosure.
Figure 6:
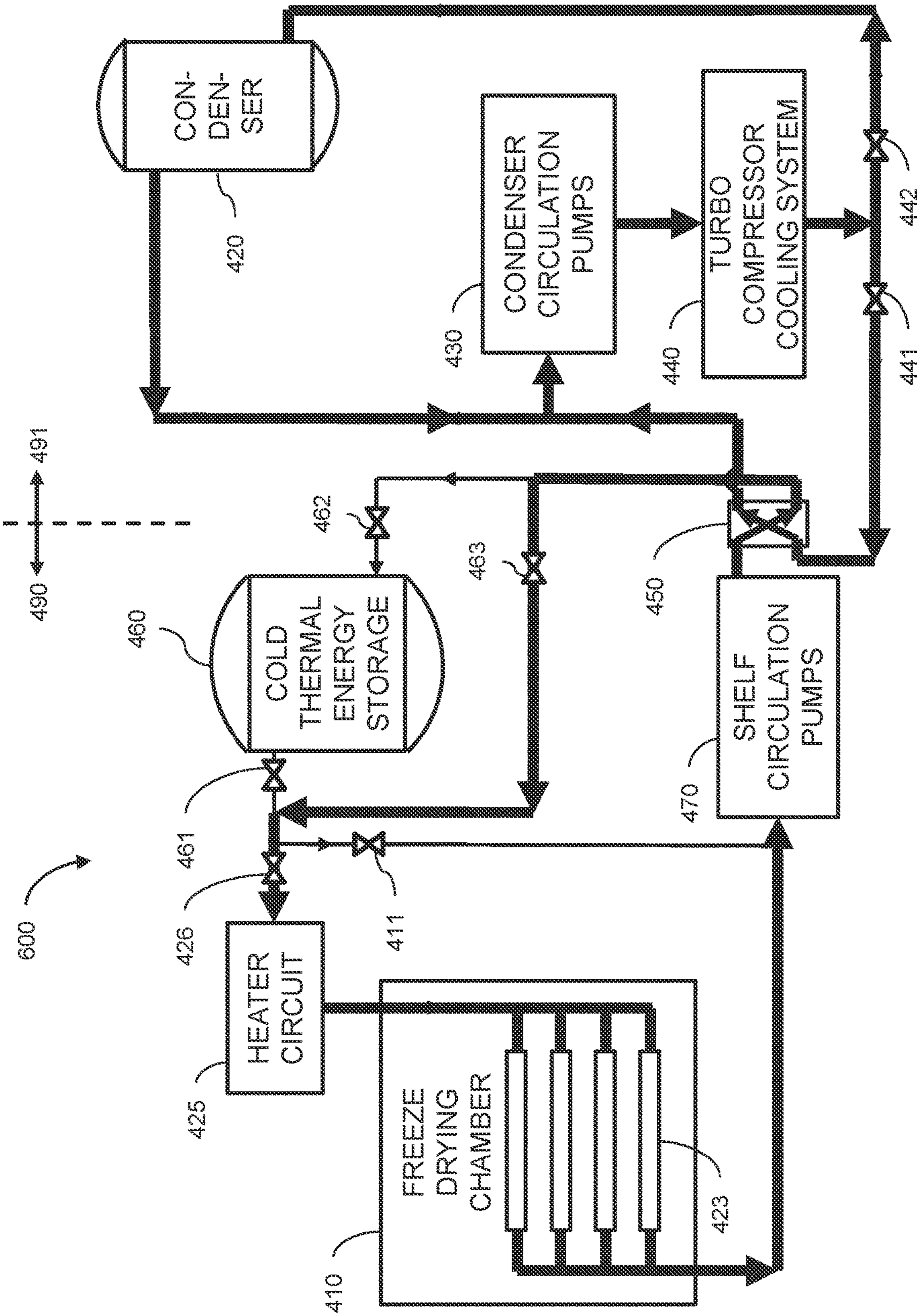
FIG. 6 is a schematic drawing of a freeze drying system operating during a lyophilization portion of a freeze drying cycle according to an embodiment of the disclosure.

A freeze dryer cooling system 400 according to one embodiment of the present disclosure is shown schematically in FIGS. 4-6. Bolded flow paths show heat transfer fluid flow during particular stages of the freeze drying cycle. In particular, FIG. 4 illustrates flow paths during the TURNAROUND portion of the cycle; FIG. 5 illustrates the FREEZE portion of the cycle and FIG. 6 illustrates the LYOPHILIZATION portion of the cycle.

Freeze drying components of the system include a freeze drying chamber 410 with cooled shelves 423, and a condenser 420, each of which must be cooled during a freeze drying cycle. The cooling system 400 includes two separate circuits, each containing a heat transfer fluid: a first circuit 491 containing the condenser 420, and a second circuit 490 containing the freeze drying chamber 410. Both circuits 490, 491 pass through an inter-circuit heat exchanger 450 such as a brazed plate heat exchanger for transferring heat energy between the two circuits. Preferably, heat exchange between fluids in the two circuits is performed without the use of an intervening or intermediate heat transfer fluid. The heat transfer fluid in each of the first and second circuits 491, 490 may be a liquid heat transfer oil.

The first circuit 491 includes a turbo compressor cooling system 440 connected for cooling the heat transfer fluid in the first circuit. The heat transfer fluid in the first circuit is circulated by the circulation pumps 430. Adjustable valves 441, 442 control the proportion of heat transfer fluid circulated from the turbo compressor cooling system 440 through the condenser 420 versus through the inter-circuit heat exchanger 450.

The turbo compressor cooling system includes a heat exchanger for transferring heat energy between the working fluid of the turbo compressor and the heat transfer fluid in the first circuit. Preferably, heat exchange between the working fluid of the turbo compressor and the heat transfer fluid in the first circuit is performed without the use of an intervening or intermediate heat transfer fluid.

The second circuit 490 of the freeze dryer cooling system 400 cools the shelves 423 or other heat transfer elements of the freeze drying chamber 410. Heat is removed from the heat transfer fluid in the second circuit 490 by an inter-circuit heat exchanger 450 and transferred to the heat transfer fluid in the first circuit 491. The heat transfer fluid in the second circuit 490 is circulated by the shelf/CTES circulation pumps 470.

The CTES system 460 is selectively included in (or excluded from) the second circuit 490 using a bypass valve 463 and valves 461, 462. As explained in more detail below, heat may be transferred from the CTES 460 to the heat transfer fluid in the first circuit 491 (to refreeze the CTES), or stored cold thermal energy may be transferred from the CTES to the heat transfer fluid (to supplement the turbo compressor cooling system in cooling the shelves). Preferably, heat exchange between the CTES 460 and the fluid in the second circuit 490 is performed without the use of an intervening or intermediate heat transfer fluid; i.e., without the use of another heat transfer fluid to transfer heat between the CTES 460 and the heat transfer fluid in the first circuit 491.

A heater circuit 425 is provided to selectively heat the heat transfer fluid flowing to the freeze drying chamber 410 during the sublimation portion of the freeze drying cycle. A valve 426, together with a bypass valve 411, regulate flow of heat transfer fluid either through the shelves 423 or bypassing the shelf circuit during refreezing of the CTES.

The bolded circuit lines of the exemplary cooling system 400 shown in FIG. 4 represent the flow of heat transfer fluid in the two circuits 490, 491 during the TURNAROUND portion 320 of the freeze drying cycle (FIG. 3) during which the CTES system is re-frozen for use in the next freeze drying cycle. During that time, the freeze drying chamber 410 and the condenser 420 are not in use for freeze drying, and no product is processed in the freeze drying chamber.

In the configuration shown in FIG. 4, the valve 442 is closed and the valve 441 is opened, causing the heat transfer fluid in the first circuit 491 to circulate between the turbo-compressor cooling system 440 and the inter-circuit heat exchanger 450, without cooling the condenser 420. The total cooling capacity of the turbo-compressor cooling system 440 is therefore directed to cooling the heat transfer fluid of the second circuit 490 via the inter-circuit heat exchanger 450.

As further shown in FIG. 4, the heat transfer fluid in the second circuit 490 is circulated directly from the inter-circuit heat exchanger 450 to the CTES system 460. The valve 411 is opened and the valve 426 is closed, bypassing the freeze drying chamber 410 in the second circuit 490.

The bolded flow path shown in FIG. 4 permits the CTES system 460 to be refrozen and prepared for the next freeze drying cycle during parts of the TURNAROUND portion 320 of the freeze drying cycle when either or both the freeze drying chamber 410 and the condenser 420 are bypassed by the cooling system. During one or more of the unloading, defrosting, cleaning, sterilizing, drying and leak checking operations performed during the TURNAROUND portion of the cycle, when those freeze drying components are bypassed, the cooling system is available for refreezing the CTES system 460. It can be seen that such an arrangement allows for the use of the CTES system 460 to supplement the turbo-compressor cooling system 440 with no or minimal increase in overall cycle time caused by refreezing the CTES system.

The bolded flow paths of the exemplary cooling system 500 shown in FIG. 5 illustrate operation of the system and flow of heat transfer fluid in the two circuits 490, 491 during the FREEZE portion 318 of the freeze drying cycle. The heat transfer fluid of the first circuit 491 is distributed to both the condenser 420 and the inter-circuit heat exchanger 450 by opening both valves 441, 442. Flow to the condenser 420 is controlled to bring that component to process temperature.

Heat transfer fluid in the second circuit 490, as shown in FIG. 5, is cooled by the turbo-compressor cooling system 440 via the inter-circuit heat exchanger 450. The heat transfer fluid in the second circuit 490 is further cooled by the CTES 460 before being circulated in the shelves 423 of the freeze drying chamber 410. The combined cooling capacity of the turbo-compressor cooling system 440 and the CTES 460 are therefore available to rapidly cool the shelves to process temperatures and maintain them there during the FREEZE portion 317 of the freeze drying cycle. That increased cooling capacity from the CTES therefore reduces the cycle time used by the FREEZE portion of the cycle. The CTES may also be used to supplement the turbo-compressor cooling system 440 during the LYOPHILIZATION portion 318 of the freeze drying cycle if required.

The exemplary cooling system 600 as shown in FIG. 6 illustrates operation of the system and flow of heat transfer fluid in the two circuits 490, 491 during the LYOPHILIZATION portion 318 (FIG. 3) of the freeze drying cycle. The CTES system 460 may be bypassed during LYOPHILIZATION by closing the valve 462 and opening the bypass valve 463. The CTES may not be required to supplement the turbo-compressor cooling system 440 to maintain process temperatures in the freeze drying chamber 410.

The heater circuit 425, which is not activated during the FREEZE portion of the cycle, is used to add heat energy to the shelves to cause sublimation under vacuum during the LYOPHILIZATION portion of the cycle.

While both the condenser 420 and the shelves 423 are cooled by the turbo-compressor cooling system 440, those two freeze drying system components have different cooling requirements. The condenser 420 generally has lower temperature requirements than the shelves, but does not require a high cooling capacity to achieve and maintain those low temperatures. In contrast, the shelves 423 do not require chilling to temperatures as low as those required by the condenser, but require greater cooling capacity than the condenser 420. In the freeze drying cooling system shown in FIGS. 4, 5 and 6, the condenser 420 is placed in the first circuit 491 with the turbo-compressor cooling system 440, while the shelves 423 are placed in the second circuit 490, with the CTES 460. The turbo-compressor cooling system 440 meets the cooling capacity requirements of the condenser 420 without supplementing with the CTES 460. Cooling requirements of the shelves are met by supplementing the turbo-compressor with the CTES in the second circuit 490, without unnecessarily cooling the heat transfer fluid used in the first circuit 491 for cooling the condenser.

Figure 7:
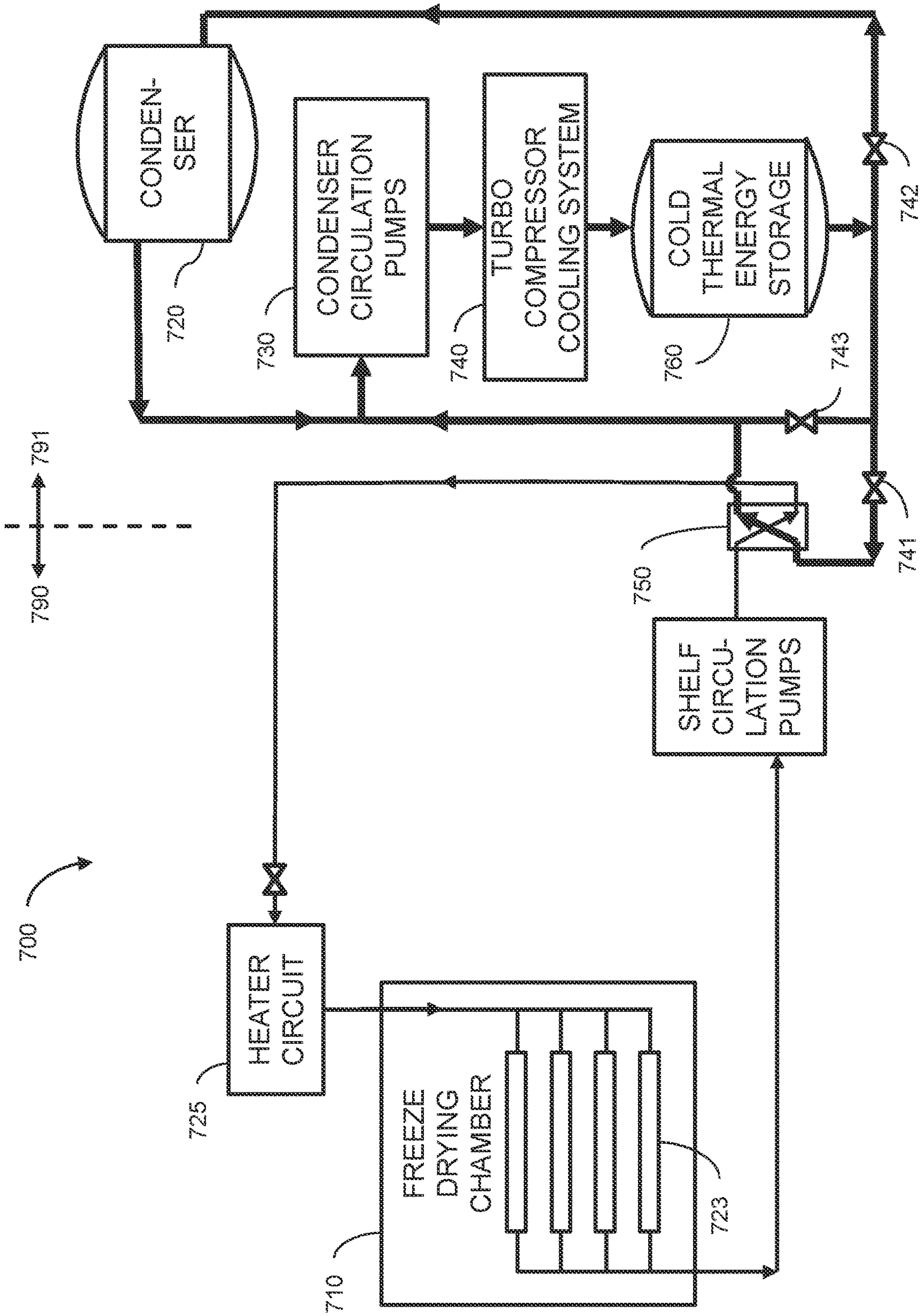
FIG. 7 is a schematic drawing of a freeze drying system according to an alternative embodiment of the disclosure.

An exemplary cooling system 700, shown in FIG. 7, illustrates an alternative embodiment of the system. In the configuration of FIG. 7, the CTES 760 is placed in the first heat exchange fluid circuit 791, which is shown as bolded lines, rather than in the second heat exchange fluid circuit as shown in FIGS. 4-6. In the cooling system 700 of FIG. 7, the CTES 760 is placed in-line with the turbo-compressor cooling system 740.

By placing the CTES 760 in a separate circuit 791 from the circuit 790 containing the freeze drying chamber 710, the shelf circuit 723 of the freeze drying chamber may be operated in heating simultaneously with recharging the CTES. During the freeze drying process, the heater 725 is typically activated and the heat transfer fluid in the circuit 790 is at temperatures above the refreeze temperature of the CTES. Those conditions prevent recharging of a CTES placed in the same circuit 790 as the shelves 723. In the cooling system 700, shown in FIG. 7, the CTES is placed line with the turbo compressor expander in the primary cooling circuit 791. In that configuration the placement of the CTES in the circuit 791 allows the CTES to be charged while the freeze drying process is occurring as there may be parts of the cycle, specifically during primary and secondary drying where there exists an excess of energy from the turbo compressor expander allowing refreezing to begin. In this case the primary cooling loop would be run at a temperature cold enough to allow the refreeze process to occur.

Should the set point of the condenser 720 be above the set point of the primary loop 791, valve 742 will open in proportion to the amount of cooling required to maintain the condenser at its set point. The valve 741 may be closed and the valve 743 may be opened to bypass the inter-circuit heat exchanger 750, the second circuit 790 and shelves 723, in which case a primary cooling loop is created. That primary cooling loop is independent of shelf or condenser cooling, and includes the pumps 730, the turbo compressor 740 and the CTES 760, for direct and efficient recharging of the CTES.

Figure 8:
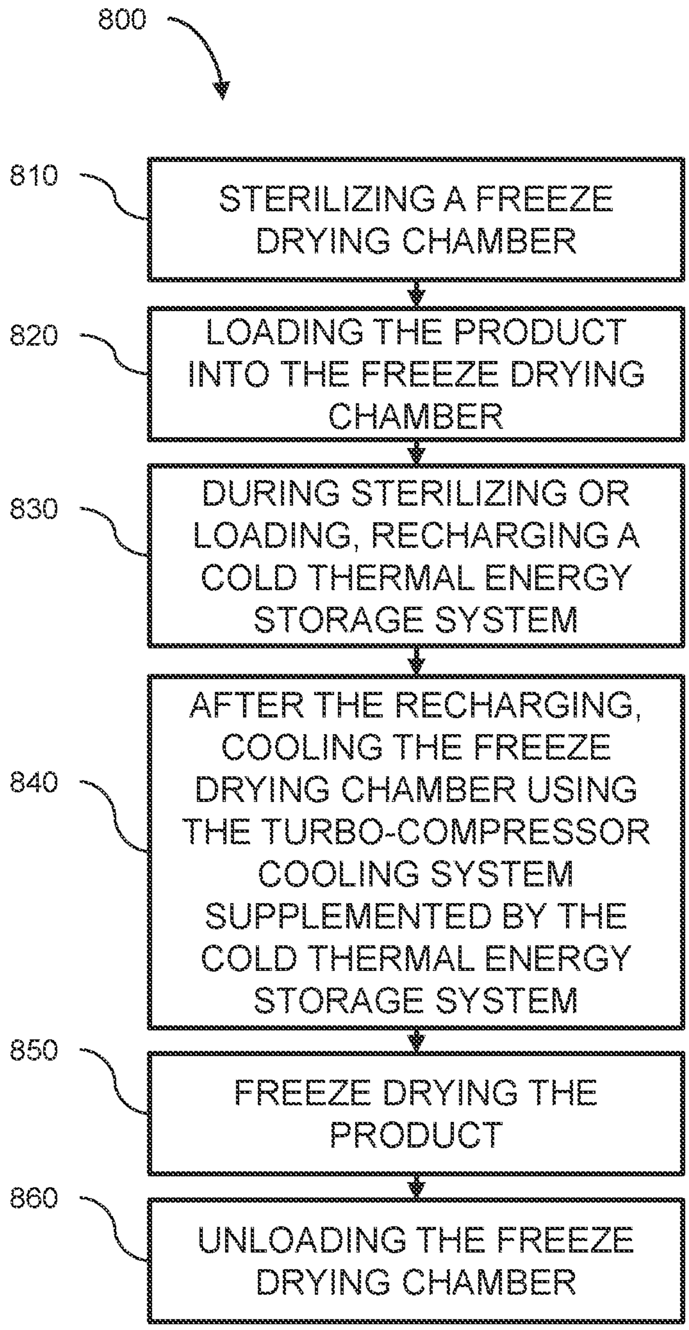
FIG. 8 is a flow chart showing a method in accordance with one aspect of the disclosure.

A method 800 in accordance with embodiments of the disclosure is shown in FIG. 8. The freeze drying chamber is initially sanitized or sterilized (operation 810) after removing product processed during the previous cycle. In pharmaceuticals manufacturing, all equipment components having contact with the product or process are typically cleaned using a clean-in-place (CIP) arrangement and sterilized using steam or chemical fluid washers installed permanently on the equipment. During the cleaning and sterilization operations, no product is present in the freeze drying chamber.

The product is then loaded (operation 820) into the freeze drying chamber by placing the product on the shelves. The product may be in bulk form or may be in vials having partially opened stoppers allowing water vapor to escape rom the vial during the lyophilization process. Both the product and the freeze drying chamber shelves are at ambient temperature or are prechilled during the loading process. In one embodiment, the CTES system is used to speed the prechilling process. In another embodiment, the CTES system is bypassed during the prechilling process, preserving the cold thermal energy of the CTES for use in cooling product loaded shelf by shelf.

The CTES system is recharged (operation 830) during one or more operations of the TURNAROUND portion 320 of the freeze drying cycle (FIG. 3). The CTES system is recharged by cooling the phase change material of the CTES system using the turbo-compressor cooling system. In the embodiment described above with reference to FIG. 4, two separate heat transfer fluid circuits 490, 491 are used in the recharging of the CTES. The heat transfer fluid in the first circuit 491 is cooled by the turbo-compressor cooling system. That heat transfer fluid is used to cool the heat transfer fluid in the second circuit 490, which, in turn, is routed through the CTES system to refreeze the phase change material.

Because the recharging operation 830 is performed in parallel with the sterilizing and loading operations 810, 820, the use of the CTES system to supplement the turbo-compressor cooling system does not unduly lengthen the overall freeze drying cycle time.

Once the CTES system is recharged, the freeze drying chamber is cooled (operation 840) and the product is frozen using the turbo-compressor cooling system supplemented by the CTES. The length of time required to perform this operation is reduced by using the CTES to supplement the turbo-compressor cooling system. In the embodiment including a CTES system based on a phase change material, the phase change material remains at a substantially constant temperature as heat is transferred from the shelves of the freeze drying chamber by the heat transfer fluid. During this operation, the condenser may also be chilled using heat transfer fluid cooled by the turbo-compressor cooling system, in preparation for the freeze drying operation.

After the product is frozen, the product is freeze dried (lyophilized) (operation 850) in the freeze drying chamber. The freeze drying operation typically includes maintaining the product in a frozen condition while subjecting the product to a vacuum pressure. A small amount of heat is added to the product to initiate sublimation of the frozen solvent or suspension medium.

Finally, the chamber is allowed to return to substantially ambient pressure and temperature, and the freeze-dried product is unloaded (operation 860) from the chamber. Because neither the freeze drying chamber nor the condenser is chilled during this operation, the recharging operation 830 in preparation for the next freeze drying cycle may be started during unloading.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A freeze drying system, comprising:

a freeze dryer chamber including a chamber for cooling and heating a product positioned on a shelf stack arranged within the freeze dryer chamber;

a freeze dryer condenser fluidly connected to the freeze dryer chamber for receiving exhaust gases from the freeze dryer chamber;

a first heat exchange fluid loop for circulating a first heat exchange fluid, the first heat exchange fluid loop being thermally coupled to the freeze dryer condenser for removing heat therefrom;

a turbo compressor cooling system thermally coupled to the first heat exchange fluid loop for cooling the first heat exchange fluid;

a second heat exchange fluid loop for circulating a second heat exchange fluid, the second heat exchange fluid loop being thermally coupled to the shelf stack within the freeze dryer chamber;

a heat exchanger thermally coupling the first and second heat exchange fluid loops for exchanging heat energy between the first heat exchange fluid and the second heat exchange fluid; and a cold thermal energy storage system thermally coupled to one of the first or second heat exchange fluid, the cold thermal energy storage system including a phase change material for storing cold thermal energy.

2. The freeze drying system as claimed in claim 1, wherein:

the cold thermal energy storage system is thermally coupled directly to one of the first or second heat exchange fluid loop, such that the first or second heat exchange fluid, respectively, is cooled without an intermediate heat exchange fluid.

3. The freeze drying system as claimed in claim 1, further comprising:

a bypass path in one of the first or second heat exchange fluid loop for selectively bypassing the cold thermal energy storage system.

4. The freeze drying system as claimed in claim 1, further comprising:

a bypass path in the second heat exchange fluid loop for selectively bypassing the freeze dryer chamber.

5. The freeze drying system as claimed in claim 1, further comprising:

a valve in the first heat exchange fluid loop for selectively bypassing the freeze dryer condenser.

6. The freeze drying system as claimed in claim 1, further comprising:

one or more circulation pumps disposed in the first heat exchange fluid loop for circulating the first heat exchange fluid.

7. The freeze drying system as claimed in claim 1, further comprising:

one or more circulation pumps disposed in the second heat exchange fluid loop for circulating the second heat exchange fluid.

8. The freeze drying system as claimed in claim 1, further comprising:

a heater circuit thermally coupled to the second heat exchange fluid loop for selectively heating the second heat exchange fluid.

9. The freeze drying system as claimed in claim 1, further comprising:

a bypass path in the first heat exchange fluid loop for selectively bypassing the heat exchanger.

10. A method for freeze drying a product, comprising:

loading a freeze drying chamber with the product, the product being positioned on a shelf stack arranged within the freeze drying chamber;

recharging a cold thermal energy storage system by cooling a phase change material of the cold thermal energy storage system using a turbo-compressor cooling system thermally coupled to a first heat exchange fluid loop circulating a first heat exchange fluid;

chilling an interior of the freeze drying chamber to a process temperature by circulating a second heat exchange fluid through the shelf stack using a second heat exchange fluid loop, the second heat exchange fluid being cooled via a heat exchanger, the heat exchanger thermally coupling the second heat exchange fluid loop and the first heat exchange fluid loop, the first heat exchange fluid loop being thermally coupled to both the turbo-compressor cooling and the cold thermal energy storage system;

freezing a component of the product in the freeze drying chamber to form a frozen component;

sublimating the frozen component in the freeze drying chamber to form a vapor;

condensing the vapor in a condenser fluidly connected to the freeze drying chamber, the condenser being cooled by the first heat exchange fluid loop thermally coupled to the turbo-compressor cooling system; and unloading the product from the freeze drying chamber.

11. A method for freeze drying a product, comprising:

loading a freeze drying chamber with the product, the product being positioned on a shelf stack arranged within the freeze drying chamber;

recharging a cold thermal energy storage system by cooling a phase change material of the cold thermal energy storage system using the turbo-compressor cooling system thermally coupled to a first heat exchange fluid loop circulating a first heat exchange fluid and a heat exchanger thermally coupling the first heat exchange fluid loop and a second heat exchange fluid loop, the second heat exchange fluid loop circulating a second heat exchange fluid; and chilling an interior of the freeze drying chamber to a process temperature by circulating the second heat exchange fluid through the shelf stack using the second heat exchange fluid loop, the second heat exchange fluid being cooled by the cold thermal energy storage system thermally coupled to the second heat exchange fluid loop, freezing a component of the product in the freeze drying chamber to form a frozen component;

sublimating the frozen component in the freeze drying chamber to form a vapor;

condensing the vapor in a condenser fluidly connected to the freeze drying chamber, the condenser being cooled by the first heat exchange fluid thermally coupled to the turbo-compressor cooling system; and unloading the product from the freeze drying chamber.

12. The method as claimed in claim 11, further comprising:

during the chilling the interior of the freeze drying chamber to the process temperature, circulating the first heat exchange fluid through the turbo-compressor cooling system, through the heat exchanger, and through a bypass line that bypasses the condenser; and during the sublimating the frozen component and the condensing the vapor, circulating the first heat exchange fluid through the turbo-compressor cooling system, through the heat exchanger, and through the condenser.

13. The method as claimed in claim 11, further comprising:

during the chilling the interior of the freeze drying chamber to the process temperature, circulating the second heat exchange fluid through the heat exchanger, through the cold thermal energy storage system, and through the freeze drying chamber; and during the recharging the cold thermal energy storage system, circulating the second heat exchange fluid through the heat exchanger, through the cold thermal energy storage system, and through a bypass line bypassing the freeze drying chamber.

14. The method as claimed in claim 10, wherein recharging the cold thermal energy storage system comprises:

cooling the phase change material of the cold thermal energy storage system using the first heat exchange fluid that is directly thermally coupled to both the cold thermal energy storage system and the turbo-compressor cooling system, without an intermediate heat exchange fluid.

15. The method as claimed in claim 10, further comprising:

during the chilling the interior of the freeze drying chamber to the process temperature, circulating the first heat exchange fluid through the turbo-compressor cooling system, through the cold energy storage system, through the heat exchanger and through a bypass line that bypasses the condenser; and during the sublimating the frozen component and the condensing the vapor, circulating the first heat exchange fluid through the turbo-compressor cooling system, through a bypass line that bypasses the cold energy storage system, through the heat exchanger, and through the condenser.

16. The method as claimed in claim 10, further comprising:

during the chilling the interior of the freeze drying chamber to the process temperature, circulating the second heat exchange fluid through the heat exchanger and through the freeze drying chamber; and during the recharging the cold thermal energy storage system, circulating the second heat exchange fluid through the heat exchanger and through a bypass line bypassing the freeze drying chamber.

* * * * *